Jan. 22, 1963  H. H. KOBRYNER  3,075,039
POLYPHASE LOAD CENTER BUS BAR MOUNTING
Filed July 12, 1960  3 Sheets-Sheet 1

INVENTOR.
HERMAN H. KOBRYNER
BY Ray C. Hopgood
ATTORNEY

INVENTOR.
HERMAN H. KOBRYNER
BY Ray C. Hopgood
ATTORNEY

United States Patent Office 3,075,039
Patented Jan. 22, 1963

3,075,039
POLYPHASE LOAD CENTER BUS BAR MOUNTING
Herman H. Kobryner, Forest Hills, N.Y., assignor to Murray Manufacturing Corporation, Brooklyn, N.Y.
Filed July 12, 1960, Ser. No. 42,358
9 Claims. (Cl. 174—99)

This invention relates to polyphase load centers or electrical panelboards and more particularly to the bus bar mounting arrangement for such load centers.

Load centers conventionally comprise bus bars which are separately mounted and supported in fixed spaced parallel relationship within the load center enclosure. Line terminals or connectors are connected to one end of the respective bus bars for receiving the service lines, and circuit breakers are employed for protectively connecting load circuits to the bus bars.

For several years, the trend in the electrical industry has been towards standardization of components. Concomitantly with this objective, manufacturers have looked for compactness, and ease of manufacture in the design of components and particularly in the load centers. For example, the load center plug-in type circuit breaker typifies the culmination of efforts applied by the industry. The plug-in breaker has been standardized so that breakers of major manufacturers may be used interchangeably in the load centers made by those manufacturers. The breaker is also compact, relatively simple and is amenable to manufacture by mass production techniques.

The polyphase bus bar mounting arrangement, however, has lagged behind in achieving the simplicity and ease of manufacture of the breaker.

The reason for this lag is a result of certain design considerations imposed on the bus bar mounting arrangement. The considerations are primarily of a dimensional character and are related to: the design of existing standardized circuit breakers; the design of the base or tray, which supports the bus bars; and, the standard wall construction of buildings which makes it impossible to flush-mount a box deeper than 4 inches. An economical and compact arrangement of load centers employing the standardized circuit breaker is to arrange the breakers in two parallel columns with breakers in one column facing the breakers in the other column. Since the plug-in contacts of the breakers lie on about the center line of the rectangle formed by the breakers, the contact blades of the bus bars are necessarily positioned for engagement by the breaker plug-in contacts; i.e., the bus bars are positioned under the breakers.

Each breaker engages a bus bar contact blade, at one end, and a hook on the tray at the opposite end. The tray, therefore, is formed to support the breakers along one edge thereof, and that portion of the tray supporting the breakers must be wide enough to permit the stamping out of the hooks for retaining the breakers. As a result of the standardized design of the breaker, and the manner in which it is supported on the tray and on the contact blades, the design of the tray has become U-shaped with flanges extending outwardly from the ends of the U; the flanges serving as the supporting portions for the breakers. The depth of the U-shaped channel is limited by the height of the circuit breaker and the depth of the box. The width of the U-shaped channel is determined by the width of the breaker rectangle, and is approximately two breaker lengths. The standardized tray design is approximately ¾ inch deep, with a channel width of about 4½ inches. This is the available space for accommodating the bus bars.

With increased demands for electric power, the cross section of the bus bars must also increase to carry the higher current. A major problem, therefore, has been to accommodate in the standardized tray, bus bars of increased cross section while maintaining the necessary spacing to ground and between conductors of opposite polarity. This problem is particularly troublesome when it is desired to employ the standardized tray for a 3-phase bus bar system.

For example, in the three-phase system, a third bus bar is introduced between the two required for single phase. This creates the problem of proper spacing between the bus bars to ensure safe working conditions. One attempt has been made to solve this problem by mounting the three bus bars flat in the enclosure, and, in situ, molding them in plastic. The bus bars being arranged flat relative to the bottom of the enclosure requires an enclosure of larger width than is required for the single phase construction. Thus, the desiratum of standardization is defeated by such construction. Further, molding the bus bars in plastic is an expensive time-consuming operation—not amenable to mass production techniques. Moreovoer, once the bus bars are molded in plastic, there is no way for increasing the current carrying capacity of the bus bar arrangement.

Accordingly, it is a primary object of the invention to provide a polyphase bus bar arrangement which utilizes the standard size enclosure and tray for single phase systems; the specific size depending on the current rating.

It is a further object of the invention to provide a compact bus bar arrangement, wherein the current carrying capacity may be varied simply by adding additional current carrying members to the two outer bars of a 3-bar system, and by utilizing a center bus bar of increased width; the remaining components of the structure, such as the supports, insulating barriers, etc., being unchanged.

It is a feature of the invention to provide a simple and unique insulating arrangement for the bus bars. It is another feature of the invention to provide a construction which is simple, relatively easy to manufacture and permits standardization of each of the component parts. The novel design minimizes the cost of retooling once the basic unit design is determined, allows simplified stocking of the parts and, concomitantly, simplifies ordering and merchandizing of the component parts.

In accordance with an aspect of the invention there is provided a novel polyphase bus bar arrangement comprising three flat bus bars positioned side-by-side, the outer two bars being mounted on edge and the intermediate bus bar being mounted flat relative to a base supporting structure. Safe spacing between adjacent bars is ensured, preferably, by a simple fiber board which extends over the center bus bar and under the two outer bus bars.

In accordance with a second aspect of the invention, additional bars may be fastened to the original ones to increase the current capacity of the arrangement.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
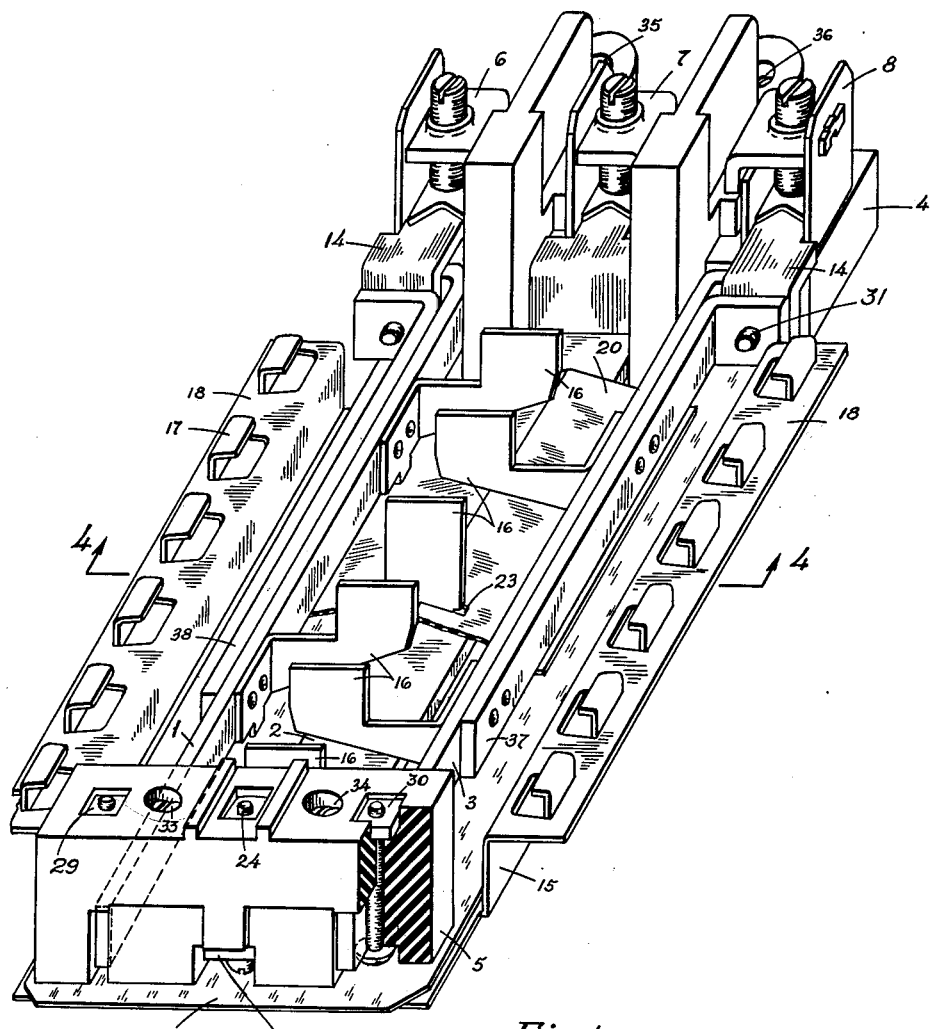
FIG. 1 is a perspective view of the assembled bus bar arrangement, with a portion of the fiber board insulation removed.

Referring to FIG. 1, the novel polyphase bus bar arrangement comprises three bus bars 1, 2 and 3 supported at opposite ends by insulator blocks 4, 5. The block 4 is preferably a molded plastic provided with three insulated spaced compartments for connectors 6, 7 and 8. The connectors are preferably of a lay-in type described in Patent No. 2,872,656, and are adapted to receive service mains, or main conductors for feeding branch lines.

Figure 2:
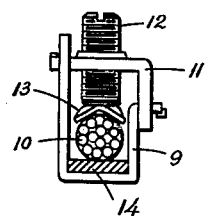
FIG. 2 is a diagrammatic view of a suitable lay-in pressure connector.

By way of example, a suitable lay-in connector is shown in FIG. 2 and comprises a cradle portion 9 for accommodating the conductor 10, a bridge 11 extending over the cradle and secured to the opposite sides of the cradle portion, a screw 12 extending through the bridge and a pressure plate 13 attached to the underside of the screw for bearing against the conductor 10.

The base of the connector cradle is shaped to accommodate an end of the bus bar, or if desired a fitting 14 which is affixed at one end to the bus bar. The bus bars are thus secured to the connectors and the connectors are rigidly secured, e.g. by screws, to the insulator block 4, as will be described in detail later.

The opposite ends of the respective bus bars are fixedly secured within channels or grooves formed within the insulator block 5. The bus bar portions within the channels are shown by dash lines in FIG. 1.

In accordance with the invention, the two outer bus bars 1 and 3 are mounted on edge relative to the base of a tray or support 15, and the intermediate bus bar 2 is mounted flat relative to the base.

Each of the bus bars is provided with contact blades 16. The contact blades on the two outer bars 1, 3 are shaped to extend towards and overlie the middle bus bar, and the blades on the middle bus bar are simply L shaped to extend upwardly. The blades are disposed so that when the bus bars are in position, the blades are aligned longitudinally, and the successive blades extend from alternate bus bars. The blade construction is designed to receive plug-in type circuit breakers one of which is shown diagrammatically at B in FIG. 4. As shown, one end of the breaker is provided with a foot portion which fits under a hooked-lug 17 formed-up on the flanges 18 of the tray 15. The opposite end of the breaker is provided with a clip contact member which is forced over the contact blade. It is apparent, that by connecting three circuit breakers to adjacent blades 16, a three-phase connection may be established.

Figure 4:
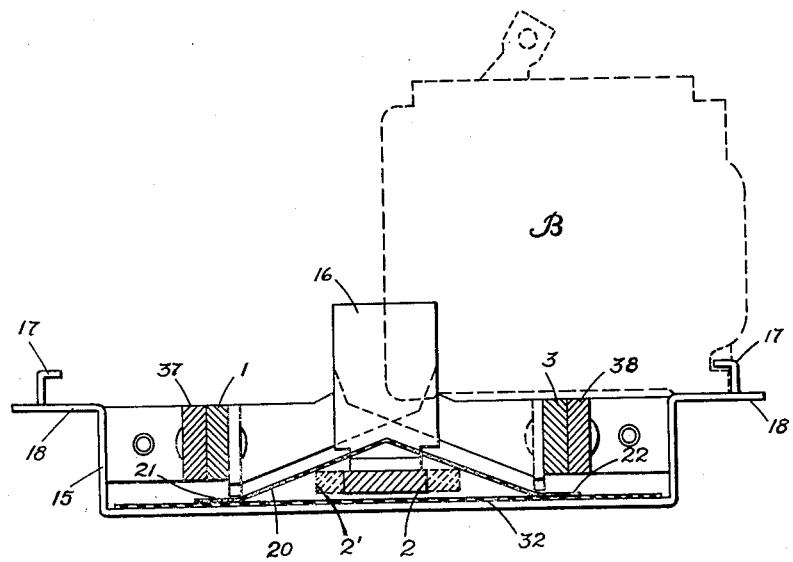
FIG. 4 is a cross-sectional view taken along line 4—4 of FIG. 1.

The bus bars are insulated from each other by means of a flexible plastic or fiber board 20 (FIGS. 1, 4) which extends over the center bus bar 2 and under the two outer bus bars 1, 3. As best seen in FIG. 4, the fiber board is in the shape of an inverted V with extensions 21, 22 which underlie the outer bus bars; an insulating board 32 provides spacing for all three bus bars from the metal tray 15. The insulating board 20 is provided with suitably shaped slots, one of which is shown at 23, FIG. 1, through which the contact blades 16 of the center bus bar pass.

The novel arrangement is assembled by first connecting the outer bus bars 1, 3 to the insulating blocks 4, 5. The outer bus bars are secured in channels provided in the block 5 by nut and bolt assemblies 29, 30. For example, the nut may extend upwardly from the base of the block, the flange of the head of the bolt bearing against the bottom of the bus bar; and the bolt being secured by a nut mounted in a recess in the top of the block.

Figure 3:
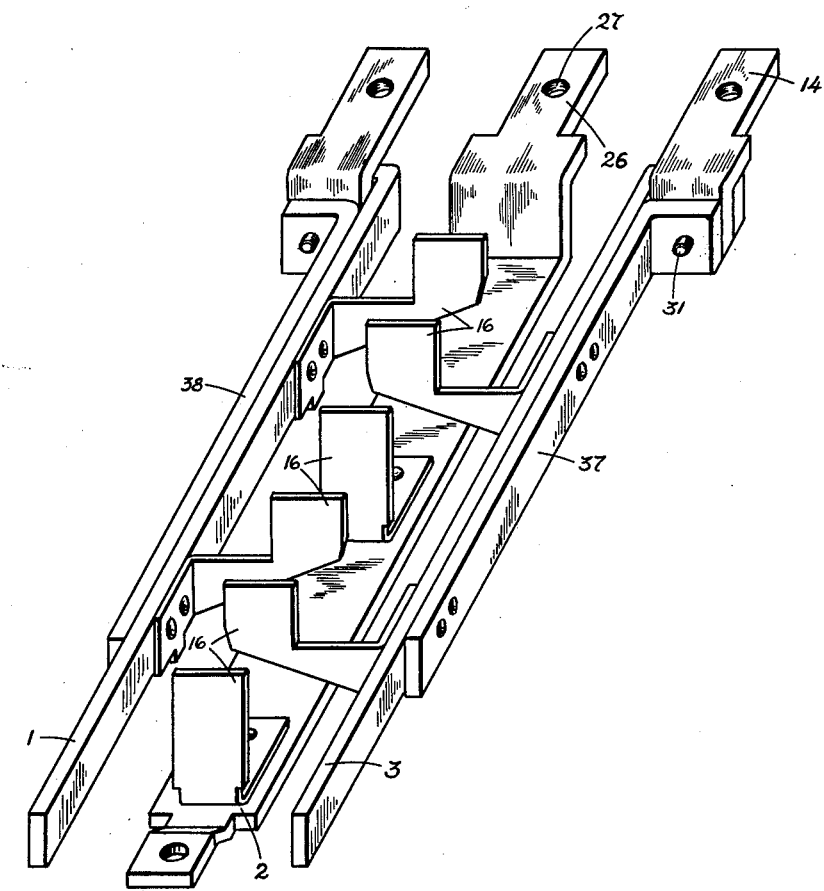
FIG. 3 is a perspective view of only the three bus bars.

One end of each of the outer bus bars 1 and 3 is, in the embodiment illustrated in FIGURES 1 and 3, secured, for example, by a screw 31, engaging the fitting 14. The opposite ends of the conductors are secured to the block 4 by means of screws (such as illustrated at 28 in FIGURE 5), which extend upwardly from the base of the block.

The center bus bar 2, with the fiber board 20 properly located so that the blades 16 extend through the slots, is then attached to the insulating blocks 4, 5. The center bar is connected to the block 5 by a screw 24, passing through the top of the block and engaging a narrowed portion 25 of the bus bar which fits into a groove provided for such purpose.

As best seen in FIGURE 3, the opposite end of the center bus bar is formed in the shape of a Z, including a tongue portion 26, which fits into the base of the lay-in connector. The bus bar and connector are secured to the block 4 by a screw extending from the base of the block through a hole provided in the base of the connector and threading into a tapped hole 27 in the tongue portion 26 of the bar.

Figure 5:
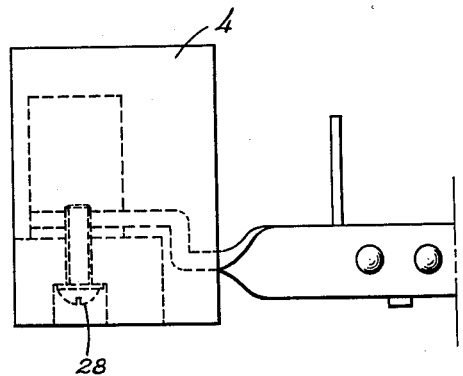
FIG. 5 is a simplified partial view of an alternate bus bar mounting arrangement.

In FIG. 5, an alternative embodiment is illustrated for connecting the outer bus bars to the connectors. Instead of fittings 14, the bus bars are twisted and shaped to fit into the base of the connectors, as shown.

The bus bar assembly is now ready for mounting in the support or tray 15. An insulating sheet 32, which may be plastic or fiber, is positioned on the base of the support (FIG. 4). The assembly is fixed to the support by means of screws 33, 34, 35 and 36 (FIG. 1) which pass through the blocks and engage tapped holes in the support.

In accordance with another aspect of the invention, the current carrying capacity of the arrangement may be increased by adding adjoining bus bars 37, 38, to the outer conductors, as shown in FIGS. 3, 4, and widening the center bus bar, as suggested by the dashed lines 2'. The additional side bus bars may be secured to the basic structure by means of screws, rivets or the like. In FIG. 3, the fitting 14 is shown nestled between the two bus bars. The added bus bars need only extend to the last contact blade since no current flows beyond that juncture.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. A polyphase bus bar arrangement comprising a support member having a substantially flat base, a plurality of bus bars rigidly connected to said support in side-by-side relationship, the two outer bus bars lying in planes substantially parallel to each other and perpendicular to the plane of said base, the intermediate bus bar lying in a plane parallel to said base, and means insulating each of said bus bars from the others.

2. The arrangement according to claim 1, wherein said insulating means comprises a sheet of insulating material shaped to extend over the intermediate bus bar and under the two outer bus bars.

3. The arrangement according to claim 2, and further comprising a plurality of contact blades joining each of said bus bars, the blades extending perpendicularly from the two outer bus bars towards and overlying the intermediate bus bar and the blades from the center bus bar extending upwardly, the blades being spaced on the bus bars so that successive blades extend from alternate bus bars, and said insulating sheet being provided with slots through which the blades on said intermediate bus bar pass.

4. A polyphase bus bar arrangement comprising a support member having a substantially flat base, first and second insulator blocks spaced longitudinally of said support member and rigidly mounted to said base, three bus bars, one end of said bus bars fitting into channels in said first insulator block, means rigidly securing said one end of said bus bars to said first insulator block, said second insulator block being divided into three compartments aligned respectively with said bus bars, a wire connector mounted in each of said compartments, means respectively connecting each of said bus bars to each of said connectors, the bus bars being mounted in side-by-side relationship, the two outer bus bars lying in planes substantially parallel to each other and perpendicular to the plane of said base, and the intermediate bus bar lying in a plane parallel to said base.

5. The arrangement according to claim 4 and further comprising a sheet of insulating material shaped to extend over the intermediate bus bar and under the two outer bus bars.

6. The arrangement according to claim 5, and further comprising a plurality of contact blades joining each of said bus bars, the blades extending perpendicularly from the two outer bus bars towards and overlying the intermediate bus bar and the blades from the center bus bar extending upwardly, the blades being spaced on the bus bars so that successive blades extend from alternate bus bars, and said insulating sheet being provided with slots through which the blades on said intermediate bus bar pass.

7. The arrangement according to claim 6, wherein the current carrying capacity of said three bus bars may be selectively increased by adding additional conductive members parallel to, and contiguous with, said outer bus bars.

8. The arrangement according to claim 7, wherein said means connecting said bus bars to said connectors comprises an L-shaped fitting having one leg connected to one of said outer bus bars, and the other leg connected to said connector, and the intermediate of said bus bars having an angle shaped end portion including a tongue-like extension fitting into the associated connector.

9. The arrangement according to claim 7, wherein said means connecting said bus bars to said connectors comprises, respectively, a twisted end portion of the two outer bus bars formed to fit into the associated connectors, and the end portion of said intermediate bus bar being formed to include a tongue portion fitting into its associated connector.

References Cited in the file of this patent

UNITED STATES PATENTS

| | | |
|---|---|---|
| 2,439,956 | Wagner et al. | Apr. 20, 1948 |
| 2,468,614 | Carlson | Apr. 26, 1949 |
| 2,738,446 | Fleming | Mar. 13, 1956 |
| 2,914,708 | Edmounds | Nov. 24, 1959 |